(12) United States Patent
Bertagna et al.

(10) Patent No.: US 12,497,015 B2
(45) Date of Patent: Dec. 16, 2025

(54) DEVICE FOR DETECTING THE CLAMPING FORCE OF A BRAKE CALIPER AND CONTROL SYSTEM OF A BRAKING SYSTEM

(71) Applicant: BREMBO S.p.A., Curno (IT)

(72) Inventors: Alessandro Bertagna, Curno (IT); Fabio Battaglia, Curno (IT); Andrea Casadio, Curno (IT)

(73) Assignee: Brembo S.p.A., Bergamo (IT)

( * ) Notice: Subject to any disclaimer, the term of this patent is extended or adjusted under 35 U.S.C. 154(b) by 67 days.

(21) Appl. No.: 18/709,141

(22) PCT Filed: Nov. 14, 2022

(86) PCT No.: PCT/IB2022/060912
§ 371 (c)(1),
(2) Date: May 10, 2024

(87) PCT Pub. No.: WO2023/084476
PCT Pub. Date: May 19, 2023

(65) Prior Publication Data
US 2025/0033624 A1  Jan. 30, 2025

(30) Foreign Application Priority Data
Nov. 15, 2021 (IT) .......................... 102021000028913

(51) Int. Cl.
*B60T 17/22* (2006.01)
*F16D 66/00* (2006.01)
*G01L 5/28* (2006.01)

(52) U.S. Cl.
CPC .............. *B60T 17/22* (2013.01); *F16D 66/00* (2013.01); *G01L 5/28* (2013.01); *F16D 2066/005* (2013.01); *F16D 2066/006* (2013.01)

(58) Field of Classification Search
CPC .. B60T 17/22; B60T 2220/04; B60T 2270/82; B60T 13/741; B60T 13/74;
(Continued)

(56) References Cited

U.S. PATENT DOCUMENTS

2004/0195055 A1* 10/2004 Gilles ..................... F16D 66/00
  188/73.1
2013/0338895 A1* 12/2013 Bieltz ................... B60T 13/741
  701/70
(Continued)

FOREIGN PATENT DOCUMENTS

DE        4112371 A1    10/1992
WO     2018037848 A1    3/2018

OTHER PUBLICATIONS

European Patent Office, International Search Report, issued in PCT/IB2022/060912, Jan. 27, 2023, Rijswijk, NL.
(Continued)

*Primary Examiner* — Muhammad Shafi
(74) *Attorney, Agent, or Firm* — Marshall & Melhorn, LLC (57) ABSTRACT

A device for detecting a clamping force of a brake caliper of a vehicle braking system is provided. The device has a force sensor, a force transmitting element suitable for transmitting the clamping force exerted by the brake caliper to the force sensor, and a mechanical limit stop element. The force transmitting element is movable when subjected to the clamping force exerted by the brake caliper. The force sensor is configured to measure the clamping force up to a sensor force threshold value that is lower than a maximum clamping force exertable by the brake caliper. The mechanical limit stop element is configured to be engaged by the force transmitting element when the clamping force exceeds the sensor force threshold value.

11 Claims, 10 Drawing Sheets

(58) Field of Classification Search
CPC .............. F16D 66/00; F16D 2066/005; F16D 2066/006; G01L 5/28
USPC ..................................................... 701/34.4
See application file for complete search history.

(56) References Cited

U.S. PATENT DOCUMENTS

| | | | |
|---|---|---|---|
| 2015/0217737 A1* | 8/2015 | Hauber | F16D 65/18 188/72.3 |
| 2018/0079403 A1* | 3/2018 | Masuda | B60T 8/172 |
| 2018/0202504 A1* | 7/2018 | Hara | F16D 65/183 |

OTHER PUBLICATIONS

Italian Patent Office, Search Report in Application No. IT202100028913, dated Jul. 29, 2022.

\* cited by examiner

DEVICE FOR DETECTING THE CLAMPING FORCE OF A BRAKE CALIPER AND CONTROL SYSTEM OF A BRAKING SYSTEM

FIELD

The present invention relates to a device for detecting the clamping force of a brake caliper of a vehicle braking system. The invention is further directed to a control system of a braking system which employs the clamping force detecting device.

BACKGROUND

In modern vehicles, such as passenger cars, braking systems equipped with electronic braking systems in BBW (Brake By Wire) technology are increasingly widespread.

In an electronic braking system using the BBW technology, during the braking, it is essential to know the force applied by a pair of pads of a brake caliper to a respective brake disc, so that such a force can be modulated by the electronic braking system using the BBW technology with a typical closed-loop control. The force value applied by the caliper is compared with a reference force value required for braking, either by the vehicle driver or by an electronic driver assistance system, in order to precisely ensure that the braking force reaches such a required reference force value.

Such a comparison is carried out not only in the typical cases of braking request but also in those specific cases in which the electronic braking system using the BBW technology must respond to requests from other electronic systems with which the vehicle can be provided, e.g., such as the antilock braking wheel system (ABS, Antilock Braking System) or the Electronic Stability Control (ESC) system, or in which it must respond to low grip conditions of the vehicle itself.

In the prior art, there are mainly two ways to obtain a feedback on the applied clamping force level:
1. With a force sensor which covers the entire operating range of the caliper;
2. With an estimator which indirectly calculates the applied force based on additional measurements available on the caliper of the BBW system, such as position, current, temperature.

Option 1 has some limitations related to feasibility, costs, resolution/accuracy, and reusability.

As for the feasibility, in some cases it is not possible to have a sensor capable of reading the entire operating range of the brake caliper in the small space available in the caliper itself.

As for the costs, developing and validating a sensor with a high reading range can be very expensive.

As for the resolution/accuracy, in a sensor, the reading range, accuracy, and resolution of the sensor are interrelated characteristics and cannot be determined independently: an increase in the reading range of the sensor may result in a loss of accuracy and resolution.

As for the reusability, unless a sensor with a very wide range is also used in actuators in which a lower reading range is required, it is necessary to choose the sensor with the appropriate range for each application, and it is not possible to use the same sensor on multiple applications with different ranges, e.g., for different vehicle segments.

Option 2 has the limitation that an estimate is subject to many uncertainties and variabilities over the life of the components, e.g., due to efficiency changes, pad wear, changes in the actuator and caliper manufacturing parameters, thermal effects, changes in friction forces, etc. These aspects may result in estimates with poor levels of accuracy, especially in the first part of the low-force braking event and when the pad-disc contact point must instead be determined and detected with high accuracy.

SUMMARY

It is the object of the present invention to suggest a device for detecting the clamping force of a brake caliper of a vehicle braking system and a control system of the braking system capable of at least partially obviating the limitations and drawbacks of the solutions of the prior art.

Such an object is achieved by a device for detecting the clamping force of a brake caliper of a vehicle braking system and by a control system as described and claimed herein.

Some advantageous embodiments are also described.

DESCRIPTION OF THE FIGURES

Further features and advantages of the detecting device and the control system according to the invention will become apparent from the following description of preferred embodiments, given by way of indicative, non-limiting examples, with reference to the accompanying drawings, in which.

DETAILED DESCRIPTION

Figure 1:
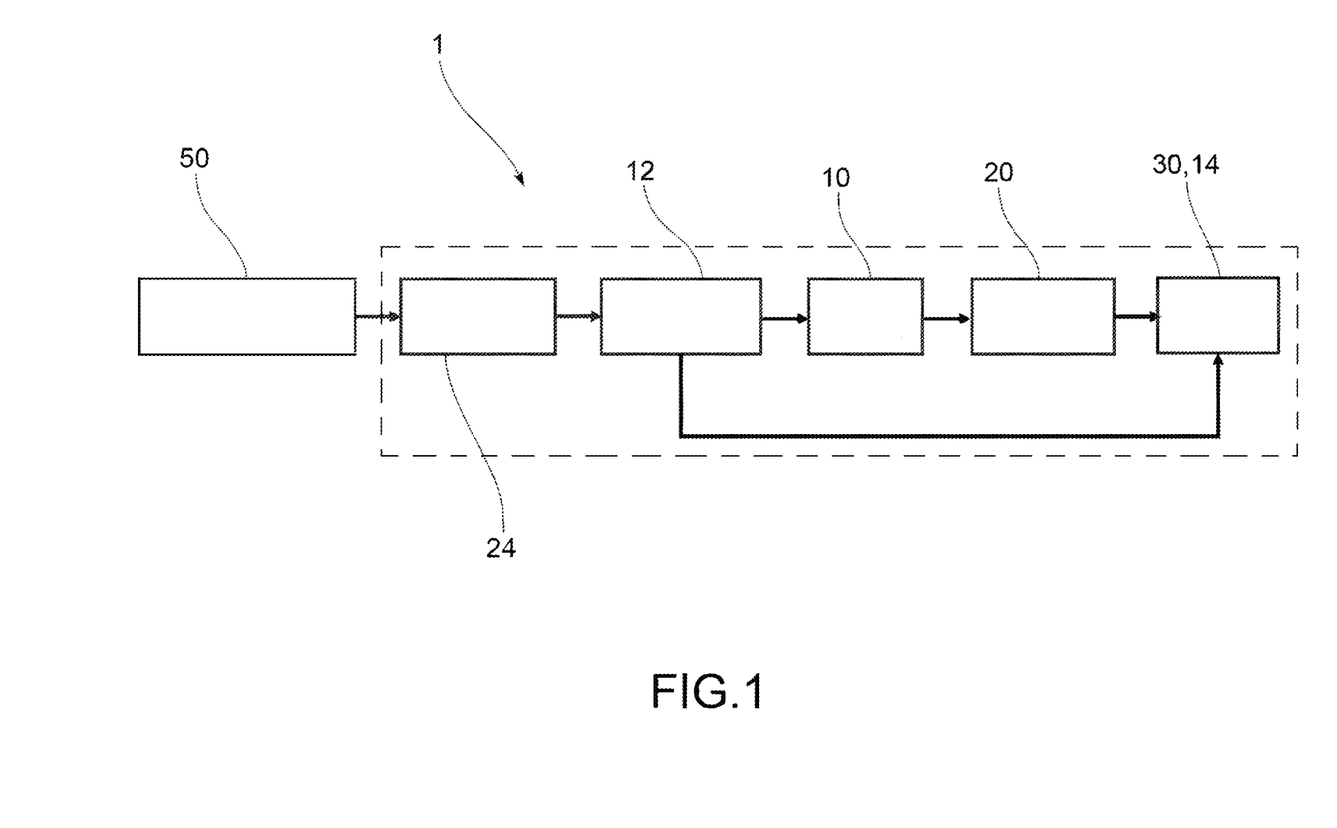
FIG. 1 is a block diagram of a device for detecting the clamping force according to the invention, in an embodiment.
Figure 2:
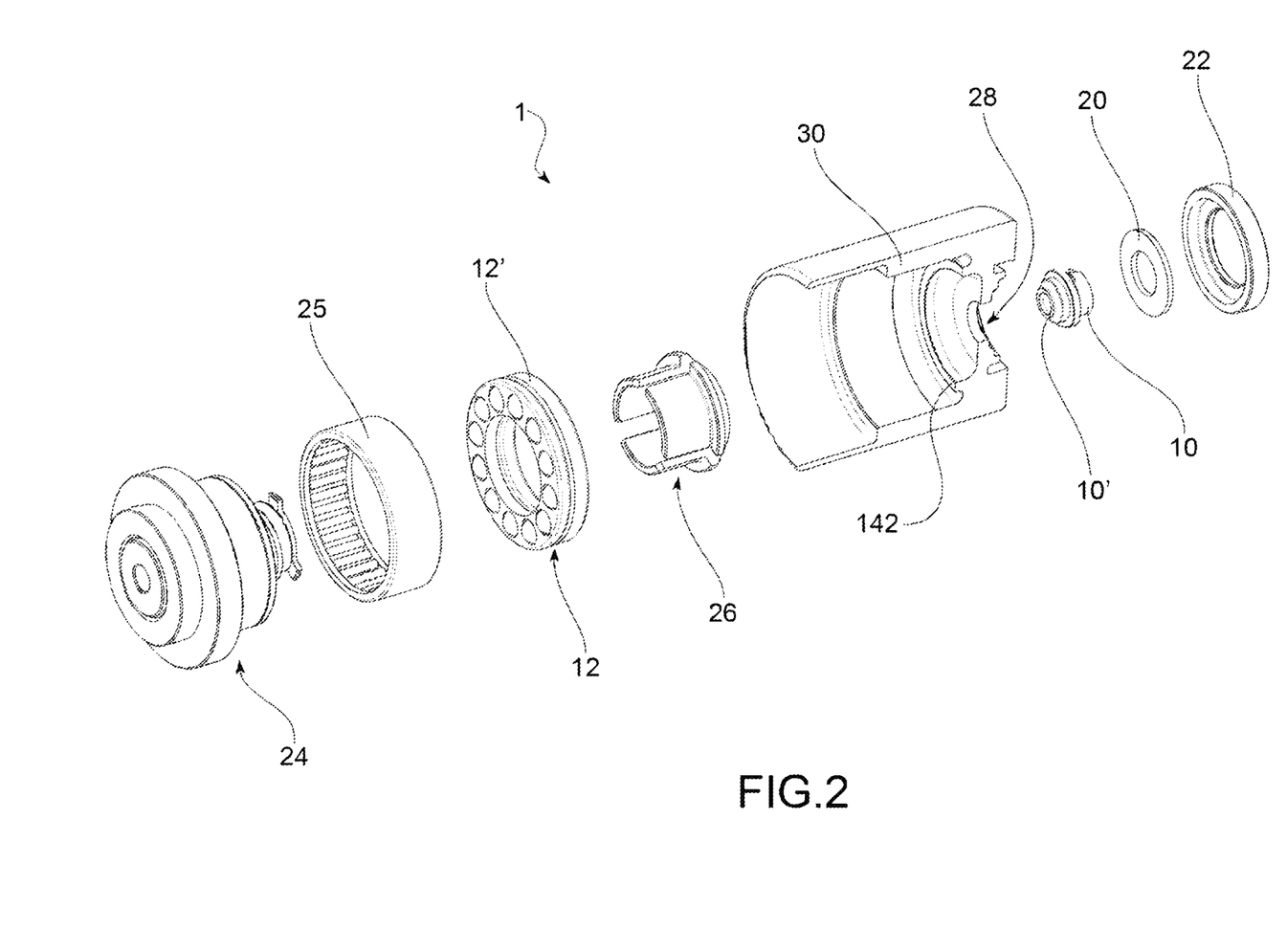
FIG. 2 is an exploded perspective view of a practical implementation of the detecting device in FIG. 1.
Figure 3:
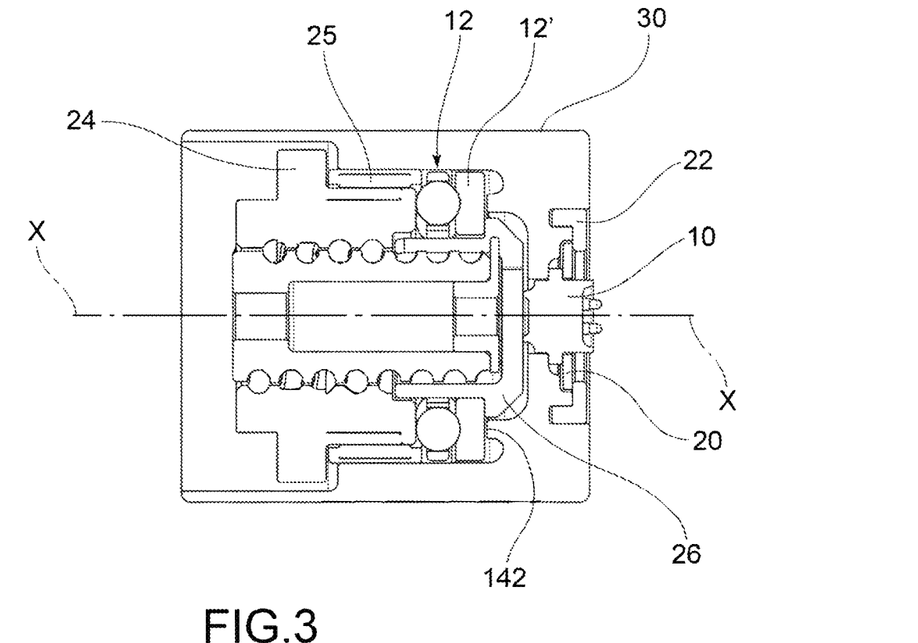
FIGS. 3 and 3a are an axial section and a perspective axial section of the detecting device in FIG. 2.
Figure 3A:
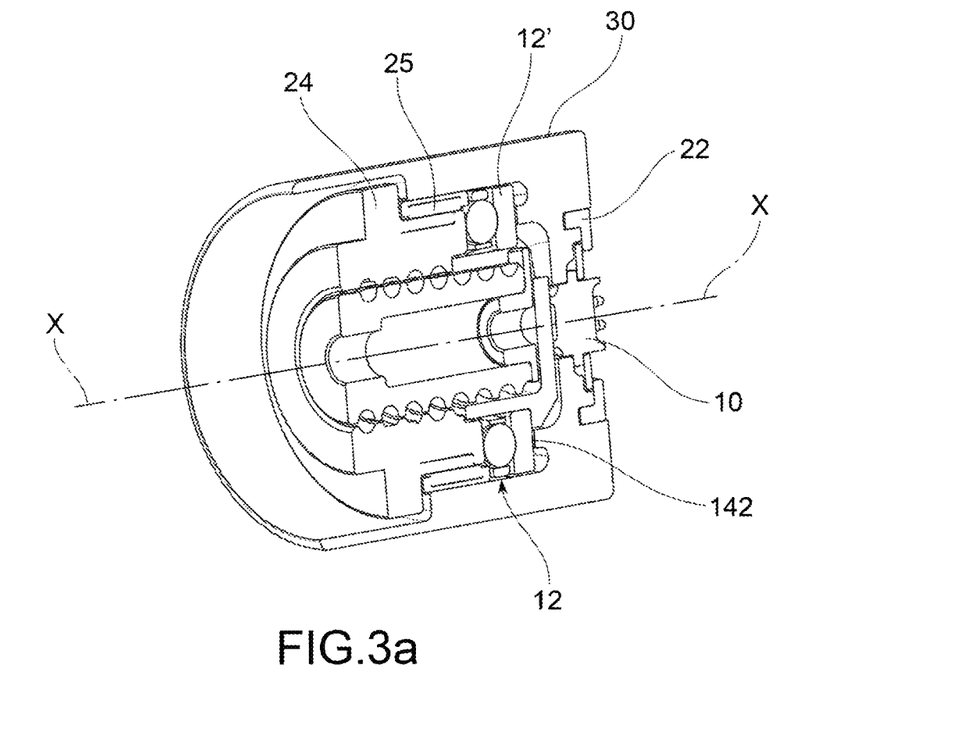
Figure 4:
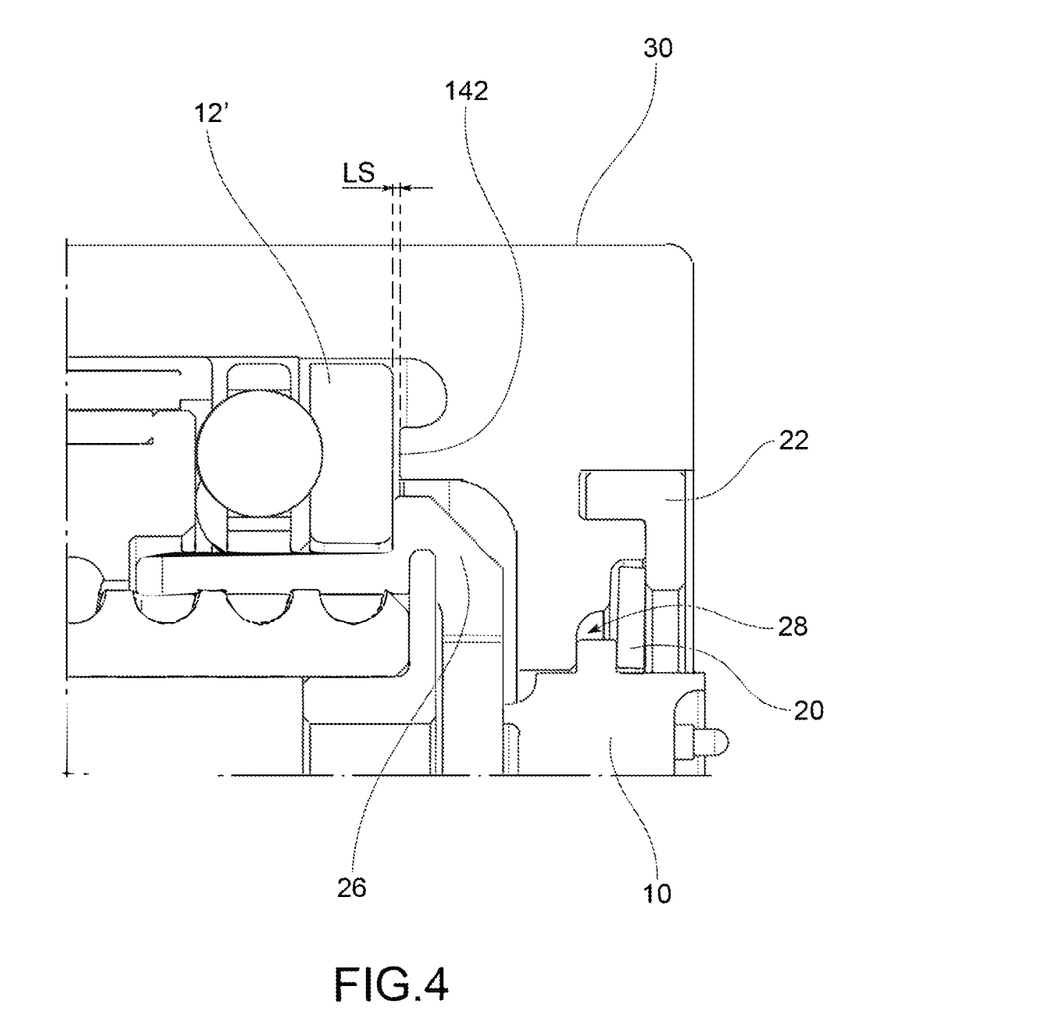
FIG. 4 is an enlarged detail of the inset detail in FIG. 3.
Figure 5:
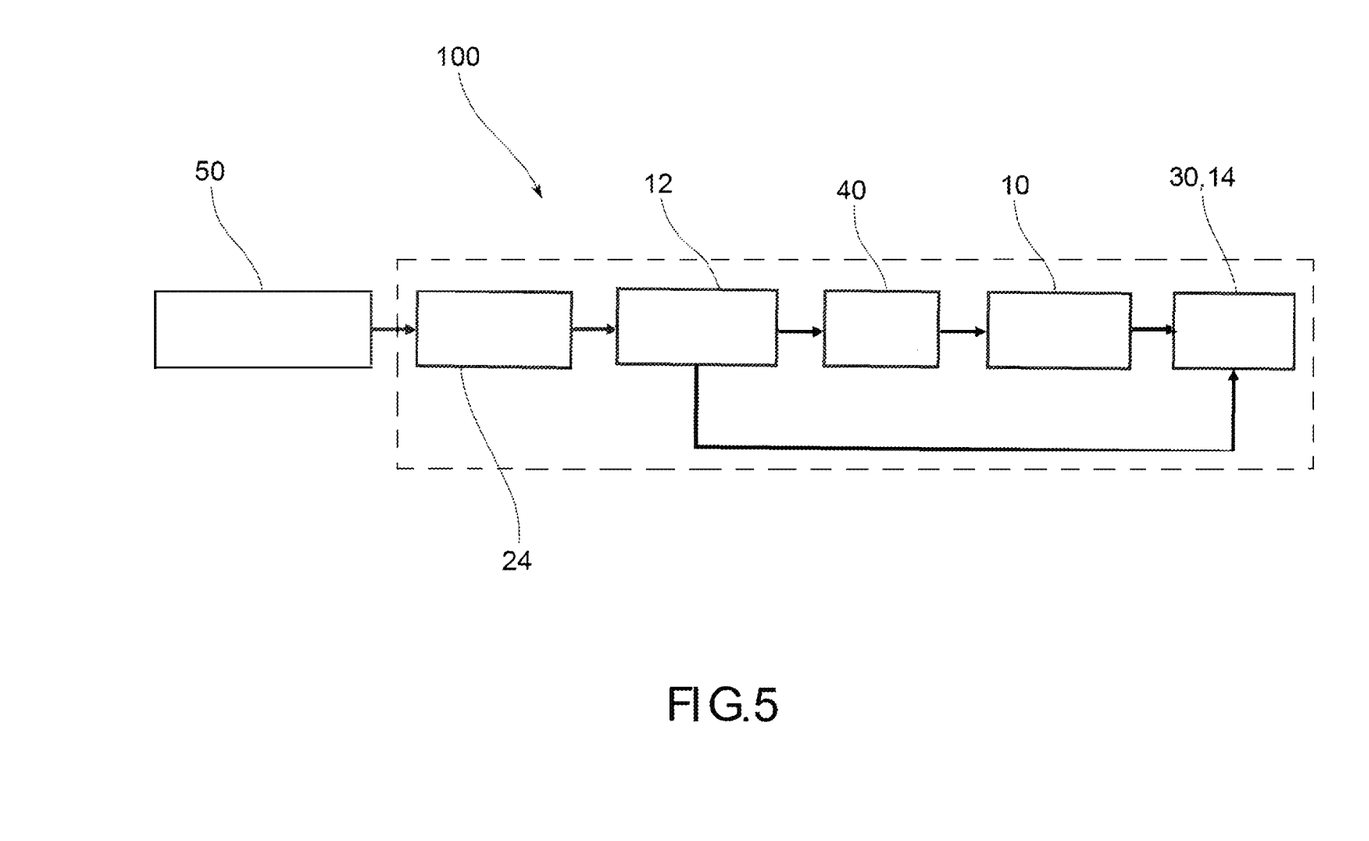
FIG. 5 is a block diagram of a device for detecting the clamping force according to the invention, in another embodiment.
Figure 6:
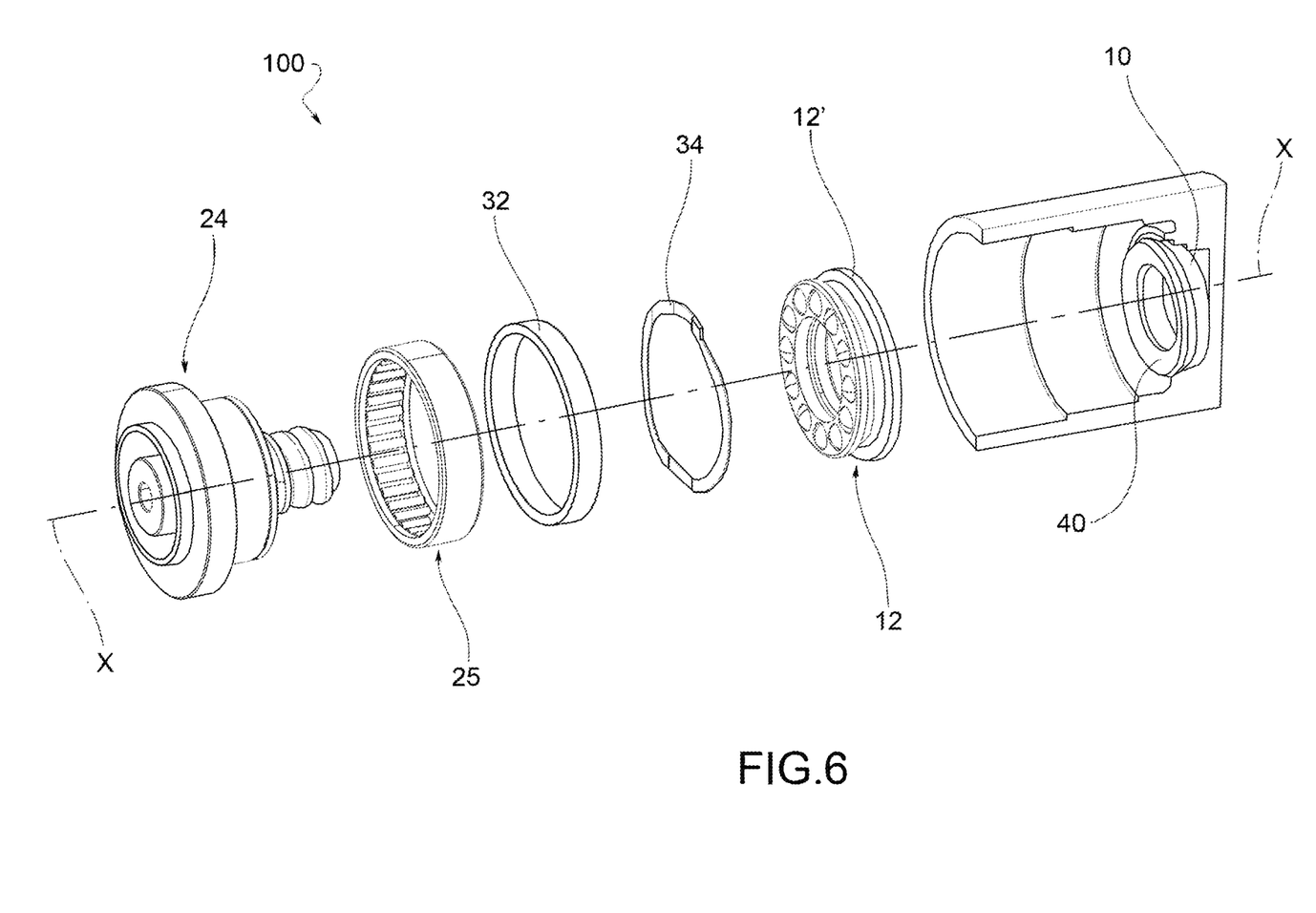
FIG. 6 is an exploded perspective view of a practical implementation of the detecting device in FIG. 5.
Figure 7:
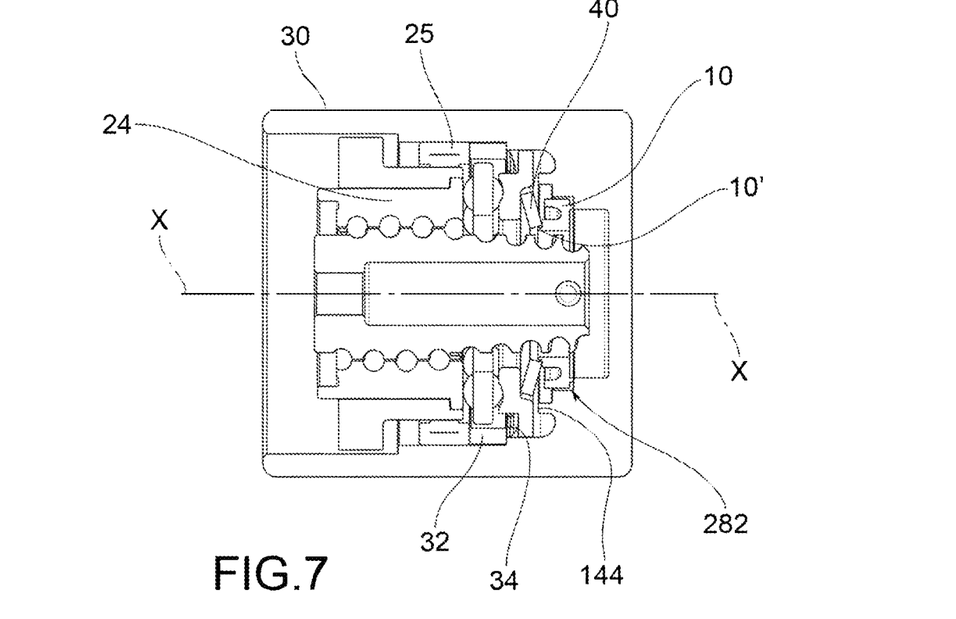
FIGS. 7 and 7a axial section and a perspective axial section of the detecting device in FIG. 6.
Figure 7A:
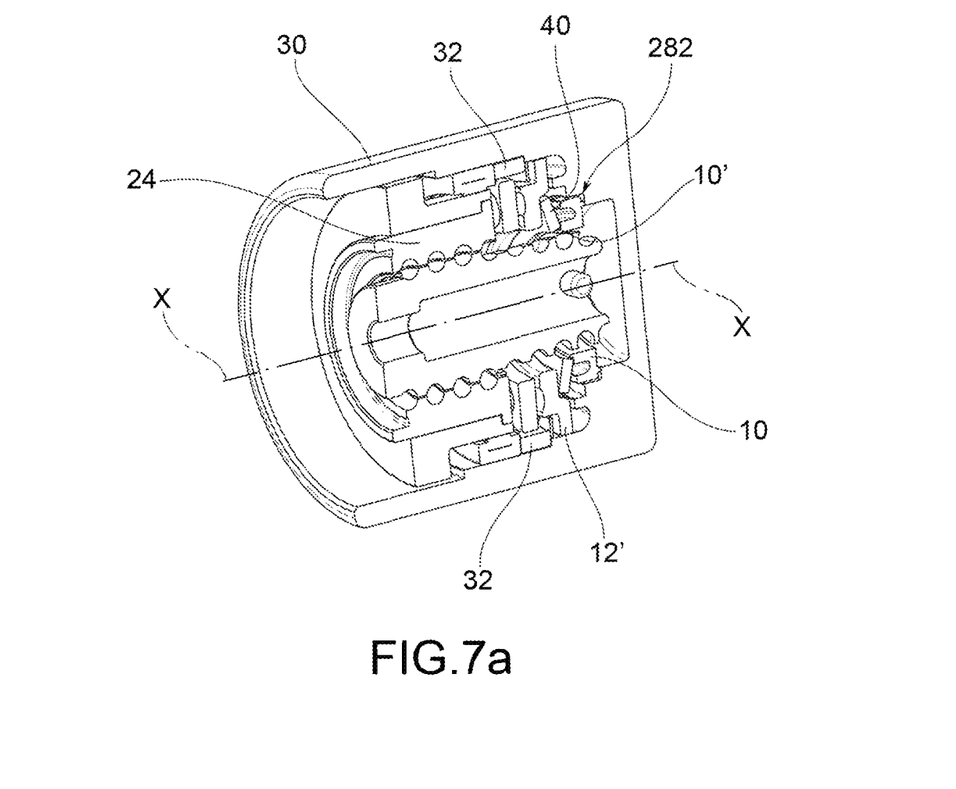
Figure 8:
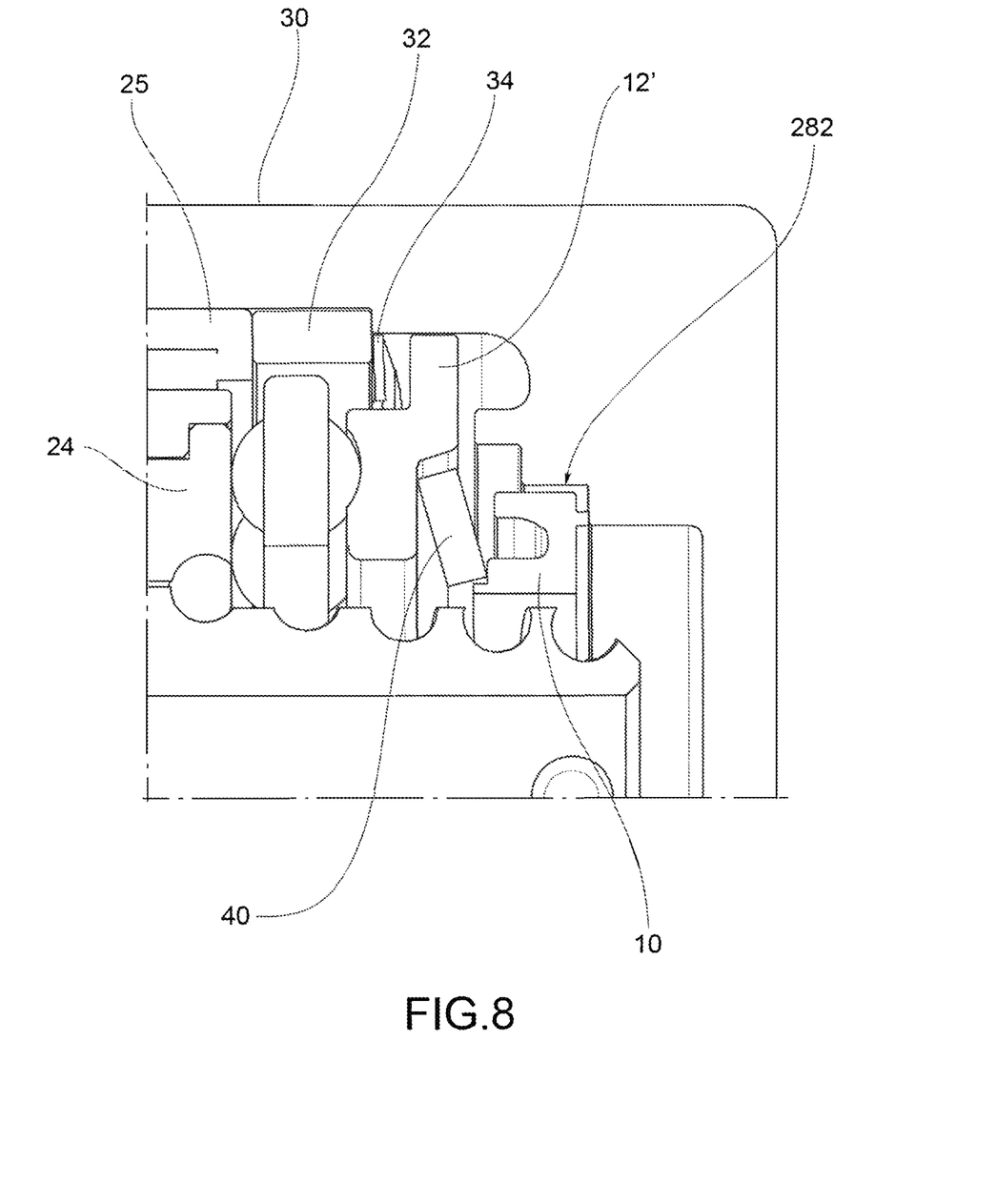
FIG. 8 is an enlarged detail of the inset detail in FIG. 7.

In the accompanying drawings, reference numerals 1; 100 indicate, as a whole and as a block diagram, a device for detecting the clamping force of a brake caliper of a vehicle braking system in two possible embodiments of the invention.

For example, the detecting device finds application in a braking system of the Brake-By-Wire type with a distributed architecture, in which each corner of the vehicle is independently controlled in a closed loop so as to minimize the error between the target, i.e., reference, braking force value and the braking force intensity actually applied by the brake caliper.

It should be noted that the value associated with the braking target and with the intensity of the force applied by the caliper can depend on the adopted control strategies, the sensor used, or the topology of the corner, and can be, for example, but not limited to, force, pressure, or torque. These measurements are interrelated and can be easily mutually converted; therefore, in the following description, such related quantities will be generally referred to as "force" or "clamping force".

Furthermore, elements common to the various embodiments are indicated by the same reference numerals.

For the purposes of the present description, a vehicle, not shown in the figures, means any vehicle or motor vehicle, even of commercial type, having two, three, four, or more wheels.

Furthermore, a braking system, not shown in the figures as well, means a set of all the components (mechanical and/or electric or electronic components, including the brake fluid) which contribute to generating the service braking of a vehicle or to generating the parking braking of a vehicle.

The following definitions will be adopted in the following description:

$F_{brake\_max}$: the maximum clamping force that the brake caliper can apply;

$F_{sensor\_FR}$: the maximum clamping force that the force sensor can measure;

$F_{sensor\_max}$: the maximum clamping force that the sensor can sustain without suffering permanent damage.

In a general embodiment, the detecting device comprises a force sensor 10, a force transmitting element 12, and a mechanical limit stop element 14.

The force sensor 10 comprises a sensitive element 10' suitable to measure a force acting thereon.

The force transmitting element 12 is suitable to transmit a clamping force applied by the brake caliper to the sensitive element 10'.

When subjected to a clamping force applied by the brake caliper, the force transmitting element 12 is movable to transmit the clamping force to the sensitive element 10'.

For example, the force transmitting element 12 is susceptible to translate along a translation axis X, e.g., parallel to the axis of application of the clamping force applied by the caliper.

The mechanical limit stop element 14 is outside the sensitive element 10'.

The force sensor 10 is configured to measure a clamping force up to a sensor force threshold value ($F_{sensor\_FR}$) which is lower than the maximum clamping force ($F_{brake\_max}$) exertable by the caliper. When the clamping force exceeds the sensor force threshold value, the mechanical limit stop element 14 is configured to be engaged by the force transmitting element 12 so as to sustain an excess clamping force ($F_{ex}$), given by the difference between the clamping force applied by the brake caliper ($F_{clamping}$) and the sensor force threshold value.

In other words, as long as the clamping force is either equal to or lower than the force sensor threshold value, the force sensor measures the clamping force. When the threshold value is exceeded, the excess force $F_{ex}$ transmitted by the force transmitting element 12 is no longer discharged onto the sensitive element 10' of the force sensor 10 but is discharged onto the mechanical limit stop element 14.

Therefore, a force sensor having a lower reading range than the range of forces to be applied by the brake caliper and having a mechanical structure sized as a function of such a limited reading range can be used. Indeed, the structure of the sensor, in particular of the sensitive part thereof, is not called upon to sustain forces which are greater than the predetermined threshold value, because such forces exceeding the threshold value are discharged onto a mechanical limit stop element outside the sensitive element 10'.

The force sensor can thus be designed to withstand up to a given maximum sensor force ($F_{sensor\_max}$) which is lower than the maximum force exertable by the caliper ($F_{brake\_max}$).

As will be described hereafter, the intensity of the clamping forces between the sensor force threshold value and the maximum value of clamping force exertable by the brake caliper can be estimated by a force estimator module of the braking system control logic, e.g., using some parameters provided by the detections carried out in the reading range of the sensor.

In an embodiment, the extent of excursion of the force transmitting element 12 is determined by the intensity of the clamping force, and the mechanical limit stop element acts as an abutment for the displacement of the force transmitting element 12.

In an embodiment, the force sensor 10 is housed in a respective sensor seat either obtained or housed in the caliper body of the brake caliper. In this case, the mechanical limit stop element is a shoulder either obtained in or applied to the sensor seat or caliper body.

In a variant, the mechanical limit stop element 14 is a portion of the force sensor 10 itself. Naturally, as mentioned above, such a portion of the force sensor is outside the sensitive element 10' and is sized so as to sustain an excess clamping force ($F_{ex}$) which can reach a maximum intensity equal to the difference between the maximum force exertable by the brake caliper ($F_{brake\_max}$) and the maximum force measurable by the sensor ($F_{sensor\_FR}$).

In an embodiment shown in FIGS. 1-4a, the force sensor 10 is elastically biased by elastic preload means 20 which contrast the clamping force applied by the brake caliper. The elastic preload means 20 are compressible so as to allow a travel of the force transmitting element 12 up to a maximum travel LS limited by the mechanical limit stop element 14.

Therefore, when the force loaded on the force transmitting element 12 reaches the preload value of the elastic preload means 20, the force transmitting element 12 begins to move axially and the sensor continues to read. The sensor stops reading when the force transmitting element 12 has reached the limit stop position abutting against the mechanical limit stop element 14, corresponding to the threshold value of the sensor.

For example, the elastic preload means 20 comprise a spring.

In this embodiment, the following can be defined:

$F_{preload}$: the preload force applied by the elastic preload means 20 when the force sensor 10 is at rest, K: the elastic constant of the elastic preload means, LS: the maximum available travel for the force transmitting element 12.

The active clamping force is transmitted from a caliper actuator 50, e.g., an electromechanical piston, through a series of stiff elements, to a front surface of the force sensor 10, which forms the sensitive element 10'. The stiff elements comprise the force transmitting element 12. For example, the force transmitting element 12 either comprises or consists of a thrust ball bearing 12', which receives the clamping force from a linear actuator 24, e.g., a ball screw actuator.

For example, the linear actuator 24 is supported by a radial bearing 25, which allows the rotation of the linear actuator 24 about the axis thereof with low friction torque For example, the force transmitting element 12 acts on the sensitive element 10' of the force sensor 10 by means of a spacer element 26.

The force sensor 10 is housed in a sensor seat 28 obtained at one end of the caliper body 30.

The caliper body 30 forms an annular shoulder 142 suitable for engaging the thrust ball bearing 12' and forming the mechanical stop element 14.

The elastic preload means 20 may be preloaded by a preload disc 22, e.g., placed as an end closure of the sensor seat 28.

The force transmitting element 12 is free to move in the axial direction, in particular towards the rear part of the brake caliper, over a limited travel LS. The travel LS is limited by the annular shoulder 142.

The working principle of the detecting device 1 in this embodiment is as follows.

At the beginning of the braking action, the caliper actuator applies a clamping force ($F_{clamping}$) to the brake pads, and thus to the brake disc, with $0<F_{clamping}<F_{sensor\_FR}$.

The clamping force is transmitted from the caliper actuator to the force transmitting element 12, e.g., through a series of stiff components.

The force transmitting element 12 transfers the clamping force to the sensitive element 10' of the force sensor 10.

The clamping force is contrasted by the force ($F_{preload}$) applied by the elastic preload means 20.

Therefore, until $F_{clamping}<F_{preload}$, the force sensor 10 does not move and is subjected to a force equal to the clamping force ($F_{clamping}$).

As the braking force increases, when $F_{clamping}$ exceeds $F_{preload}$, the force transmitting element 12 begins to move axially until it comes into contact with the mechanical limit stop element 14.

The maximum force measured by the force sensor is equal to $F_{preload}+K*LS$.

When $F_{clamping}>F_{preload}+K*LS$, thus when the force transmitting element 12 has reached the limit stop position, the excess clamping force $F_{ex}=F_{clamping}-(F_{preload}+K*LS)$ is absorbed by the caliper body, preserving the integrity of the force sensor 10.

FIGS. 5-8a show a variant of the detecting device 100.

The force sensor 10 is accommodated in a sensor seat 282, e.g., cylinder-shaped, obtained at one end of the caliper body 30.

In this case, the reaction force applied by the force sensor 10 when subjected to a clamping force is transferred to the caliper body 30.

The clamping force is transmitted from the caliper actuator to the sensitive element 10' through a force transmitting element 12 and with the interposition of one or more elastic elements 40, such as one or more disc springs, between the sensitive element and the force transmitting element. The elastic element 40 can be placed in direct contact with the sensitive element 10', or in contact with one or more additional components, interposed between the elastic element and the sensitive element.

Thus, one side of the elastic element 40 is in (direct or indirect) contact with the sensitive element 10' of the force sensor 10; the opposite side of the elastic element 40 is in contact with the force transmitting element 12. Also in this embodiment, the force transmitting element 12 can either comprise or consist of an axial bearing 12', i.e., it is in contact with one or more additional elements, interposed between the disc and the axial bearing.

The force transmitting element 12 in the form of the axial bearing 12' can be subjected to the clamping force transmitted from the caliper actuator by means of a linear actuator 24, such as ball screw actuator, or another type of rototranslating transmission.

In an embodiment, the linear actuator 24 rotates and/or translates in a radial bearing 25 locked in the caliper body so as to act, e.g., by means of a spacer 32, on an elastic preload component 34 suitable to tension the whole assembly.

An annular shoulder 144 forming the mechanical limit stop element 14 for the force transmitting element 12 is obtained or applied in the caliper body 30.

The working principle of this embodiment of the detecting device is as follows.

We consider applying a clamping force increasing from 0 N to $F_{brake\_max}$.

The caliper actuator then applies a clamping force ($F_{clamping}$) to the brake pads, and thus to the brake disc, with $0<F_{clamping}<F_{sensor\_FR}$.

The clamping force is transmitted from the caliper actuator to the force transmitting element 12, e.g., through a series of components.

The force transmitting element 12 transfers the clamping force to an elastic element 40, which in turn transfers the clamping force to the sensitive element 10' of the force sensor 10.

By virtue of the presence of the elastic element 40, the force transmitting element 12 moves in the axial direction (from the caliper actuator towards the force sensor 10).

When the clamping force exceeds the maximum force measurable by the force sensor ($F_{clamping}>F_{sensor\_FR}$), the force transmitting element 12 comes into contact with the annular shoulder 144, which thus acts as an abutment for the force transmitting element 12.

Having defined $F_{stop}$ as the clamping force which causes the force transmitting element 12 to stop against the annular shoulder 144, when $F_{clamping}>F_{stop}$, the force sensor senses only the constant force $F_{stop}$, while the excess one ($F_{ex}=F_{clamping}-F_{stop}>0N$) is discharged onto the caliper body until $F_{brake\_max}$ is reached.

In some embodiments, the detecting device has an axisymmetric shape and extends about a device axis X coaxial to the axis of application of the clamping force. Thus, the force sensor 10 has an annular, cylindrical, or disc shape. The sensitive element 10' can consist of a circular or annular surface facing the force transmitting element 12.

Figure 9:
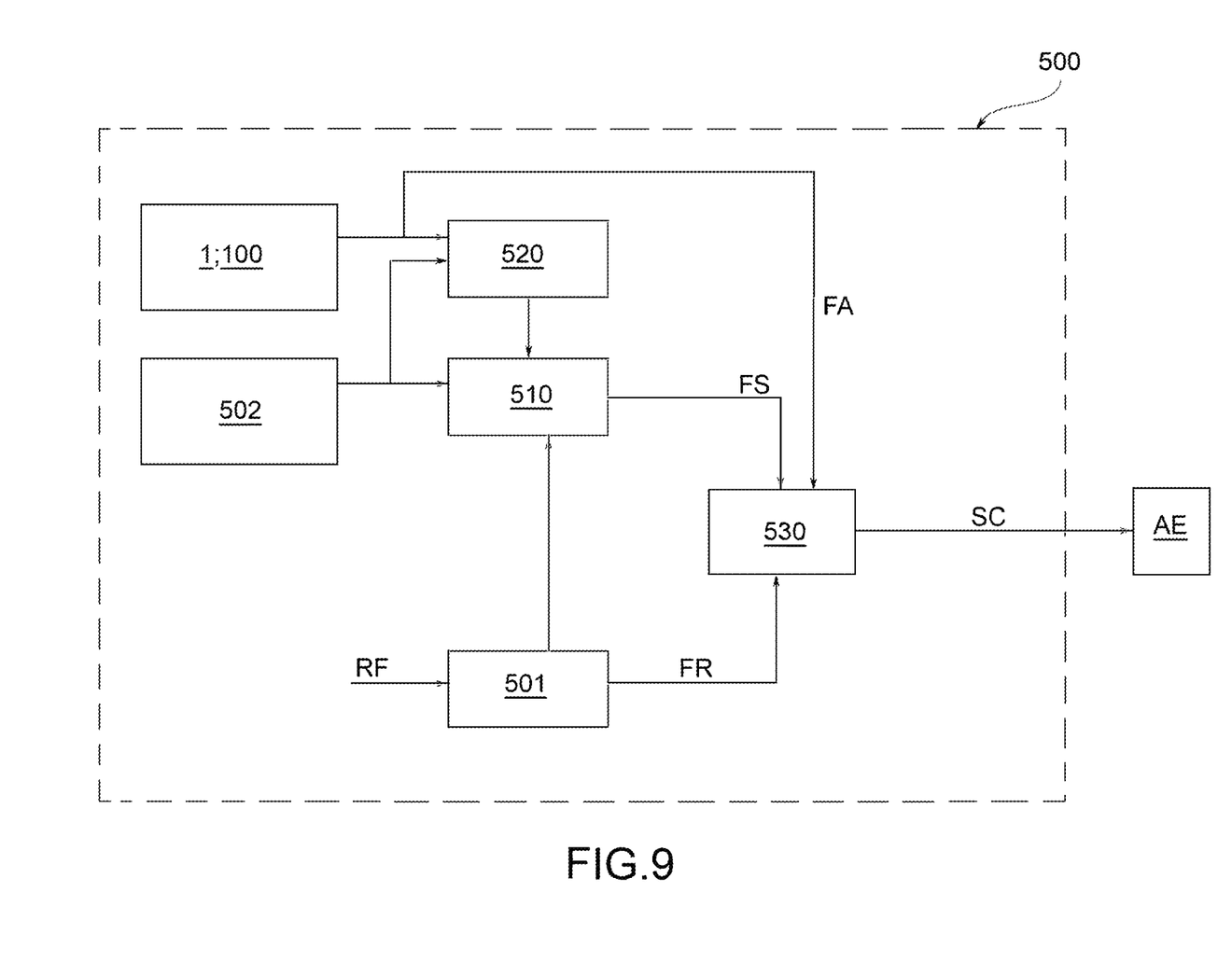
FIG. 9 shows, by means of a block diagram, an electronic control system of a vehicle braking system.

The clamping force detecting device 1; 100 can be part of an electronic control system 500 of a braking system. In particular, as mentioned above, the control system 500 is applied in a braking system of the Brake-By-Wire type with a distributed architecture, in which each corner of the vehicle is independently controlled in a closed loop so as to minimize the error between the target braking force value, that is the reference braking force value (FR), and the braking force intensity actually applied by the brake caliper.

In some embodiments, the control system 500 comprises a vehicle control module 501.

The vehicle control module 501, e.g., a hardware module and/or software logic inside a main hardware module, is configured, among its intended tasks, to receive a braking request RF (deceleration request).

Such a braking request RF can come from a brake pedal (not shown in the figures) operable by the vehicle driver and can be processed, for example, by a logic of the EBD (Electronic Brake-force Distribution) type (not shown in the figures) implementable by the vehicle control module 501 or can come from an automatic vehicle driving assistance logic, e.g., a logic of the AEB type (Autonomous Emergency Brake, not shown in the figures as well).

The vehicle control module 501 can be configured to determine a reference force FR value based on the braking request RF and possibly on other information from sensors associated with the braking system or the vehicle in general.

In other embodiments, the vehicle control module 501 is outside the control system 500 and provides the control system with the reference force value FR.

The control system 500 can comprise, in addition to one or more clamping force detecting devices 1; 100, one or more actuator sensors 502 suitable to acquire information on the status of the caliper actuator, e.g., an electro-mechanical or electro-hydraulic actuator, which is operable to command the clamping and release of the respective brake caliper.

For example, in some embodiments, the actuator sensors 502 comprise position sensors, electric voltage sensors, electric current sensors, temperature sensors, and so on.

As mentioned above, in some embodiments, the braking system comprises a force estimator module 510 configured to determine an estimated force value FS based on a caliper stiffness model represented by a theoretical stiffness curve Fx (FIG. 10) which relate the clamping force applied by the actuator to the position P of the piston of the electro-mechanical or electro-hydraulic actuator.

As mentioned above, in a braking system employing the clamping force detecting device described above, the force estimator module 510 may be used to estimate the clamping force in the force range between the maximum force value measurable by the force sensor and the maximum force value to executable by the caliper, that is to estimate the clamping forces outside the measurement range of the force sensor.

The caliper stiffness model provided by a stiffness modeling module 520.

The stiffness modeling module 520 can construct the theoretical stiffness curve Fx based on information acquired by the force sensor when this operates within the reading range thereof and information on the caliper actuator status.

Figure 10:
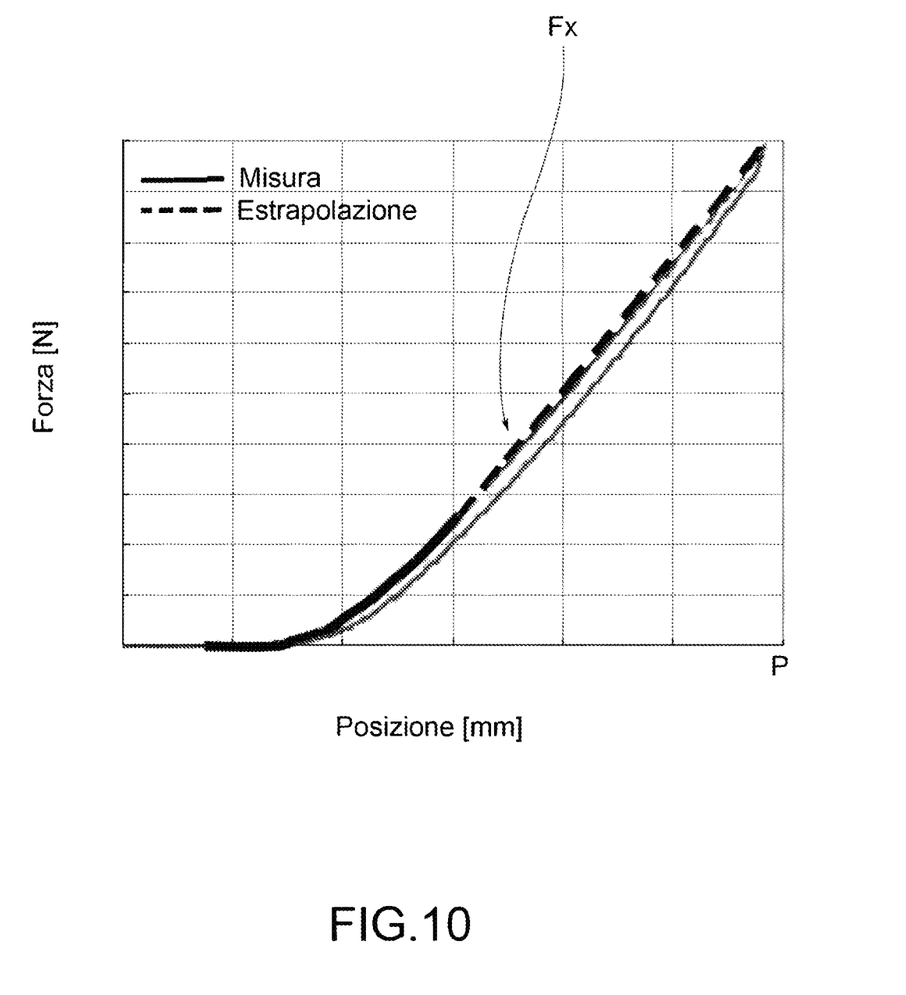
FIG. 10 depicts a theoretical stiffness curve calculated by the electronic control system and relating the clamping force applied by the caliper actuator to the position P of the piston of the electro-mechanical or electro-hydraulic actuator.

The force estimator module 510 may thus be configured to estimate the theoretical stiffness curve in the clamping force range beyond the sensor reading range and up to the maximum clamping force value of the caliper.

In other words, the stiffness model is used to estimate the force outside the reading range of the sensor so as to provide the feedback for the closed-loop control throughout the operating range of the corner.

For example, the stiffness modeling module 520 is configured to model the theoretical stiffness curve with a parabolic, cubic, or exponential curve, based on the features of the caliper in the force sensor reading range.

The control system 500 can further comprise a braking control module 530.

The braking control module 530, e.g., a hardware module and/or software logic inside a main hardware module, is configured to receive the signal representative of the estimated force value FS from the estimator module, and the signal representative of the actual force FA detected by the force sensor 10. The braking control module 530 is configured to compare one of these two signals (e.g., depending on whether the reference force value FR is below or above the predetermined threshold value), with the reference force value FR, and to generate a control signal SC of an electro-mechanical or electro-hydraulic actuator of a brake caliper of the braking system (diagrammatically depicted outside the system 1; 100 and indicated by the reference symbol AE) based on such a comparison.

The suggested detecting device solution allows achieving the intended object.

The suggested solution allows designing the force sensor to operate with a lower reading range than that of the force executable by the brake caliper.

Since the absolute error is usually proportional to the width of the sensor reading range, and the accuracy is usually expressed as a percentage of the entire sensor range, the absolute error of the sensor according to the invention with respect to the brake caliper force range decreases, especially at low clamping force values (which are the most frequent ones in use).

Using a combination of a sensor with a limited reading range with a force estimation algorithm to extend the measurement to the entire operating range of the caliper has several advantages over the solutions according to the prior art, which involves using a sensor with a higher range or using only a force estimation.

Compared to the choice of employing only a force estimation algorithm, also having a force sensor allows an accurate detection of the pad-disc contact point and ensures a correct identification of the parameter and stiffness dispersion due to thermal effect, wear, and aging of components.

Furthermore, the pad wear estimation on an electromechanical caliper is more accurate, and the corner control at low force levels has greater accuracy giving a better feel to the driver.

Since the absolute error is usually proportional to the entire range of the sensor, and the accuracy is usually expressed as a percentage of the entire range of the sensor, the absolute error of the sensor with respect to the force range of the brake caliper decreases with the present invention, especially at low clamping force values.

A sensor with a limited reading range, designed to sustain low forces, can have a small packaging that fits best to an actuator of a BbW system, with optimizations even in terms of manufacturing costs.

The suggested solution allows adopting an easily scalable force sensor for different applications with different force ranges: the same physical sensor will always measure and be subjected to the same clamping force threshold value, while only the force estimation algorithm above the threshold value may need customization to extend and adapt the scaling to the entire operating range.

A person skilled in the art may make changes and adaptations to the embodiments of the clamping force detecting device and control system of the braking system according to the invention or can replace elements with others which are functionally equivalent in order to meet contingent needs, without departing from the scope of the appended claims. Each of the features described above as belonging to a possible embodiment can be implemented independently of the other embodiments described.

The invention claimed is:

1. A device for detecting a clamping force of a brake caliper of a braking system of a vehicle, comprising:
 a force sensor comprising a sensitive element suitable for measuring a force acting thereon;
 a force transmitting element suitable for transmitting the clamping force applied by the brake caliper to the sensitive element, the force transmitting element being movable when subjected to the clamping force applied by the brake caliper to transmit the clamping force to the sensitive element; and
 a mechanical limit stop element outside the sensitive element,
 wherein the force sensor is configured to measure the clamping force up to a sensor force threshold value that is lower than a maximum clamping force to be applied by the brake caliper, and wherein the mechanical limit stop element is configured to be engaged by the force transmitting element when the clamping force exceeds the sensor force threshold value so as to sustain an excess clamping force given by a difference between the clamping force applied by the brake caliper and the sensor force threshold value; wherein: $F_{preload}$ being a preload force applied by an elastic preload means when the force sensor is at rest, K being an elastic constant of the preload elastic means, and LS being the maximum travel for the force transmitting element, a maximum force measurable by the force sensor is equal to $F_{preload}+K*LS$.

2. The device of claim 1, wherein an extent of travel of the mechanical limit stop element is determined by an intensity of the clamping force, and the mechanical limit stop element acts as an abutment for a displacement of the force transmitting element when the clamping force applied by the brake caliper exceeds the sensor force threshold value.

3. The device of claim 1, wherein the force sensor is housed in a sensor seat either obtained or housed in a caliper body of the brake caliper, and wherein the mechanical limit stop element is a shoulder either obtained or applied in the sensor seat or in the caliper body.

4. The device of claim 1, wherein the mechanical limit stop element is a portion of the force sensor.

5. The device of claim 1, wherein the force transmitting element is axially translatable along an axis parallel to an axis of application of the clamping force applied by the brake caliper.

6. The device of claim 1, wherein the force sensor is elastically biased by the elastic preload means that contrast the clamping force applied by the brake caliper, the elastic preload means being compressible so as to allow a travel of the force transmitting element up to a maximum travel limited by the mechanical limit stop element.

7. The device of claims 1, wherein:

the force sensor is housed in a sensor seat either obtained or housed in a caliper body so that the force sensor applies a reaction force to the caliper body when subjected to the clamping force applied by the brake caliper, the force transmitting element acts on the sensitive element of the force sensor with an interposition of elastic force transmitting means, and the elastic force transmitting means are compressible to allow a travel of the force transmitting element up to a maximum travel limited by the mechanical limit stop element.

8. The device of claim 7, wherein $F_{stop}$ being the clamping force applied by the brake caliper causing the force transmitting element to engage the mechanical limit stop element, if the clamping force is greater than $F_{stop}$, the force sensor is subjected to a constant force equal to $F_{stop}$ and an excess force is discharged on the mechanical limit stop element.

9. The device of claim 1, wherein the force transmitting element either comprises or consists of an axial bearing, the force transmitting element being in contact with one or more intermediate elements interposed between a brake disc and the axial bearing, the device further comprising a linear actuator configured to transmit the clamping force applied by the brake caliper to the axial bearing.

10. A control system of a braking system of a vehicle, comprising at least one device for detecting a clamping force of a brake caliper of the braking system of the vehicle, the device comprising:

a force sensor comprising a sensitive element suitable for measuring a force acting thereon;

a force transmitting element suitable for transmitting the clamping force applied by the brake caliper to the sensitive element, the force transmitting element being movable when subjected to the clamping force applied by the brake caliper to transmit the clamping force to the sensitive element; and a mechanical limit stop element outside the sensitive element, wherein the force sensor is configured to measure the clamping force up to a sensor force threshold value that is lower than a maximum clamping force to be applied by the brake caliper, and wherein the mechanical limit stop element is configured to be engaged by the force transmitting element when the clamping force exceeds the sensor force threshold value so as to sustain an excess clamping force given by a difference between the clamping force applied by the brake caliper and the sensor force threshold value, at least one actuator sensor suitable for acquiring information on a status of a caliper actuator, and a force estimating module configured to determine a clamping force value in a force range between a maximum force value measurable by the force sensor and a maximum force value to be applied by the brake caliper; wherein: $F_{preload}$ being a preload force applied by an elastic preload means when the force sensor is at rest, K being an elastic constant of the preload elastic means, and LS being the maximum travel for the force transmitting element, a maximum force measurable by the force sensor is equal to $F_{preload}+K*LS$.

11. The control system of claim 10, wherein the force estimating module determines the clamping force value based on information acquired from the force sensor when the force sensor operates within a reading range thereof and on the information on the status of the caliper actuator.

* * * * *